United States Patent
Wakabayashi et al.

[11] Patent Number: 5,976,347
[45] Date of Patent: Nov. 2, 1999

[54] MICRO CUTTING METHOD AND SYSTEM

[75] Inventors: Kimihiro Wakabayashi; Shinichi Kawamata; Masaki Yamada; Toshihide Tanaka; Masaki Nagata, all of Nakai-machi, Japan

[73] Assignee: Fuji Xerox Co., Ltd., Tokyo, Japan

[21] Appl. No.: 08/975,933

[22] Filed: Nov. 21, 1997

[30] Foreign Application Priority Data

Nov. 26, 1996 [JP] Japan ................................. 8-330260

[51] Int. Cl.$^6$ ...................................................... B23H 3/00
[52] U.S. Cl. ........................ 205/640; 205/662; 205/674; 205/686; 204/224 M
[58] Field of Search ................................. 205/640, 674, 205/686, 662; 204/224 M

[56] References Cited

U.S. PATENT DOCUMENTS

| | | | |
|---|---|---|---|
| 3,873,512 | 3/1975 | Latanision | 205/662 |
| 4,487,671 | 12/1984 | McGeough | 204/129.1 |

FOREIGN PATENT DOCUMENTS

| | | |
|---|---|---|
| A 60-100601 | 6/1985 | Japan . |
| B2 61-57123 | 12/1986 | Japan . |
| A 63-102844 | 5/1988 | Japan . |
| A 63-105982 | 5/1988 | Japan . |
| A 1-201476 | 8/1989 | Japan . |
| A 5-9701 | 1/1993 | Japan . |

OTHER PUBLICATIONS

"Designing and Manufacture of Micromachine by Process Using Ultraviolet Setting Resin," *Machine Designing*, vol. 34, No. 15, pp. 50–55, 1990. No month and/or date given.
Becker, E.W. et al. Fabrication of Microstructures with High Aspect Ratios and Great Structural Heights by Synchroton Radiation Lithography, Galvanoforming, and Plastic Moulding (LIGA Process), *Microelectronic Engineering*, vol. 4, pp. 35–56, 1986. No month and/or date given.
"Microprocessing Technique, Basic Lecture Series, Micro Electro Discharge Machining," Nikkan Kogyo Shinbun, Ltd. No month and/or date given.
Kawata, Koichi et al. "Research of Micro Electro Discharge, vol. 3, Processing of Micromachine," *Journal of Japan Society of Electrical–Machining Engineers*, vol. 28, No. 59, pp. 1–10. No month and/or date given.
"Research of Fine Wire Electro Discharge Machining—Processing Technique Using Wire Electrode of 10–$\mu$m Diameter," *Electric Processing Technique*, vol. 17, No. 57, pp. 13–18, 1993. No month and/or date given.
Masuzawa, T. et al. "Precision Machining of Micro Spindles, 1$^{st}$ Report, Development of Wire Electrodischarge Grinding Method," *Journal of Japan Society of Electro–Machining Engineers*, vol. 25, No. 48, pp. 14–23. No month and/or date given.
"Overview of Electrolytic Machining," *Metal Surface Technique*, vol. 31, No. 1, pp. 2–11. No month and/or date given.
"Ultrasonic Piercing," *Machinery*, vol. 27, No. 27, pp. 1011–1020, 1964. No month and/or date given.
"Research of Vibration Processing System in Fine Field, vol. 2." Proceedings of Spring–term Federation of Japan Society for Precision Engineering in 1995, pp. 533–534. No month and/or date given.

(List continued on next page.)

*Primary Examiner*—Arun S. Phasge
*Assistant Examiner*—Thomas H. Parsons
*Attorney, Agent, or Firm*—Oliff & Berridge, PLC

[57] ABSTRACT

A method of three-dimensionally microcutting a metal material suitable for molds is provided. An electrolyte is interposed between a work piece which is made of a conductive material, and an electrode. Through application of an electrolysis voltage between the work piece and the electrode with the electrolyte interposed between them, a passive state film is formed on the surface of a to-be-cut part of the work piece. Then, the passive state film on the surface of the to-be-cut part of the work piece is cut.

22 Claims, 11 Drawing Sheets

OTHER PUBLICATIONS

"Mechanical Process in 1nm Depth Unit of Mica Under Atomic Force Microscope," Proceedings of Autumn–term Federation of Japan Society for Precision Engineering in 1994, pp. 723–724. No month and/or date given.

"Mechanical Fine Processing by STM," Proceedings of Spring–term Federation of Japan Society for Precision Engineering in 1994, pp. 5–6. No month and/or date given.

Sugawara et al., "Drill Grinder with Fine Diameter and Performance of Centering Device," Proceedings of Autumn–term Federation of Japan Society for Precision Engineering in 1983, p. 41. No month and/or date given.

"Application of EDG onto Microdrill and End mill," Proceedings of Spring–term Federation of Japan Society for Precision Engineering in 1989, pp. 1091–1092. No month and/or date given.

"Development of Multi–purpose Fine Processing Machine for Concurrent Use for Discharge and Cutting," Proceedings of the 1 –th National Conference of the Japan Society of Electrical–Machining Engineers, pp. 111–114, 1991. No month and/or date given.

"Deka–Ban Technical Books, All about End mill," issued Taiga Shuppan, K.K.

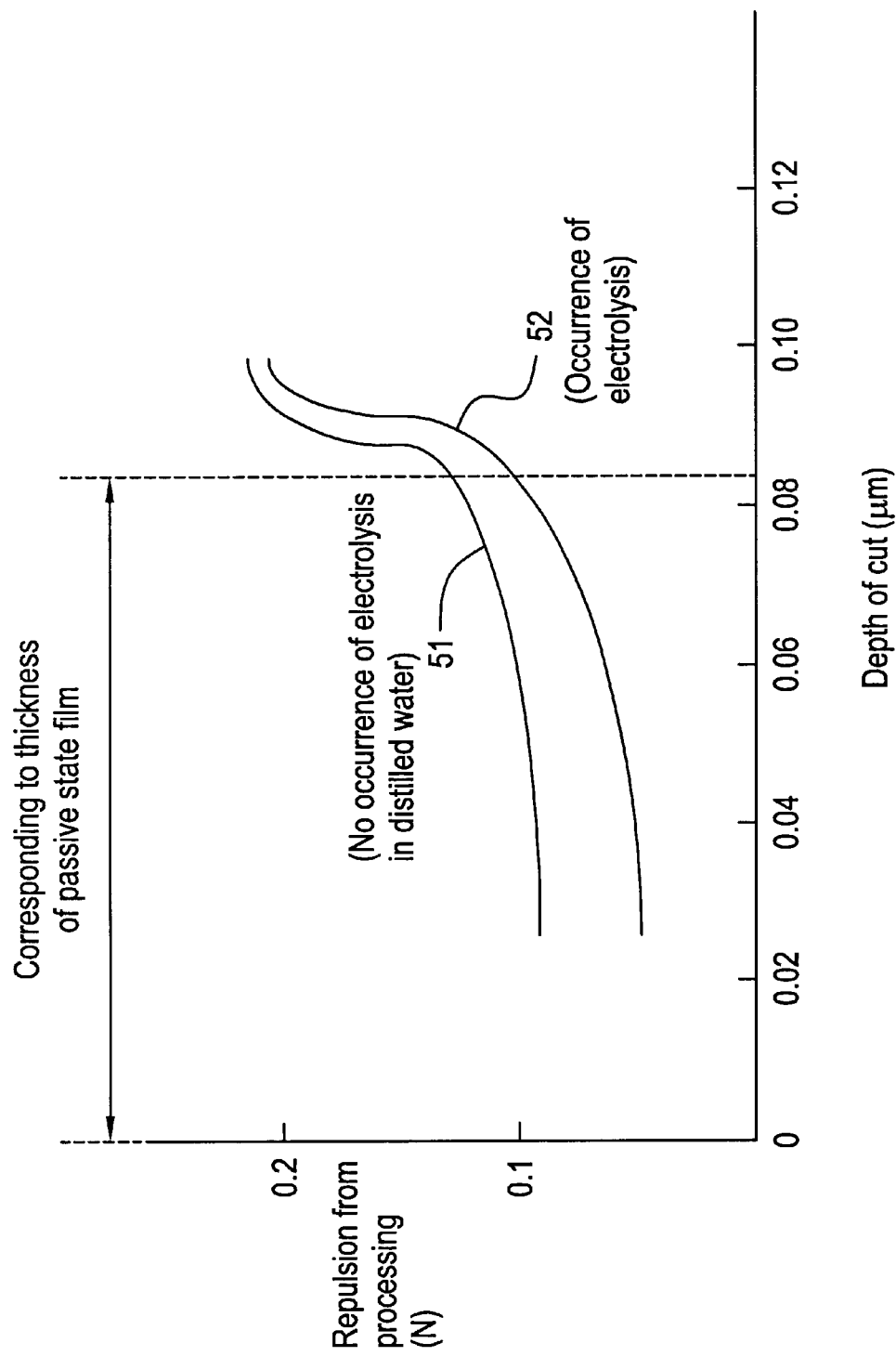

MICRO CUTTING METHOD AND SYSTEM

BACKGROUND OF THE INVENTION

1. Field of the Invention

The present invention relates to a fine cutting method for cutting works made of conductive metal materials such as ink-jet head parts, fine optical parts, and molds for injection molding these parts, which have a groove width or hole diameter of several $\mu$m to several hundreds $\mu$m, primarily ten $\mu$m plus several $\mu$m to several tens $\mu$m, precisely at a fine dimension; and a system to be used for the method.

2. Description of the Background Art

Following the increase of instruments to which recent high technology is applied and the social demand for energy saving, the densification and miniaturization of mechanical systems have been facilitated. The demand for micro machining is very high. Integration of electronic circuits, sensors and actuators have satisfied these demands partially.

However, the demand for micro machining is not only for electronic circuit-related parts. The demand for micro machining is escalated for parts regulating fluids and physical quantities including light and magnetism, for example ink-jet heads, optical printers, microlens for photo-electromagnetic heads. Demands have been present for three-dimensional micro machining of these parts at about several $\mu$m to several hundreds $\mu$m, primarily ten plus several $\mu$m to several tens $\mu$m as the dimension for example of a groove width or a hole diameter.

Two-dimensional micro machining, as in the case of an electronic circuit, has hardly met the demand for such three-dimensional micro machining.

To satisfy the demand for such three-dimensional micro machining, attempts have been made by various methods. However, almost no method suitable for the demand for three-dimensional micro machining for example of a free face with curvature at such dimension as described above has been present conventionally. Conventional three-dimensional micro machining is described hereinbelow.

Micro machining methods are broadly divided as an additive process and an elimination process. Firstly, a conventional example of additive process is described.

Additive processes include physical deposition, chemical deposition, electroplating, melt injection, and optical formation; and it is said that physical deposition and chemical deposition are excellent methods capable of regulating lamination of an extremely thin film in an atomic unit or a molecular unit. Because these additive processes of themselves can hardly regulate precisely the crosswise spreading, however, some masking process is required. Thus, it is required to repeat a masking process together with film formation in a lamination manner, in order to apply these means to a process of forming a shape with a distribution in the thickness direction, namely a three-dimensional process.

An optical formation process is a technical process of processing a three-dimensional shape freely with no need of any photo-mask, by controlling the position of a collimated beam to a photo-curing resin for the application of the beam over a necessary part to cure only the necessary part, then immersing only a part of the photo-curing resin at a thickness to be cured, thereafter irradiating only the necessary part for curing with the beam, and repeating the steps described above to repeatedly laminate the cured layer.

Attempts to refine the optical formation process to apply the resulting process to micro machining are introduced in for example "Designing and Manufacture of Micromachine by Process using Ultraviolet Setting Resin", Machine Designing, Vol. 34, No. 15, pp. 50–55, 1990-11.

However, the additive process has a drawback in that a step difference occurs between single layers because of the three-dimensional process for lamination. To overcome the drawback, there is a method to refine the masking process or optical beam lamination or positional control instrumentally and to collimate the beam very finely for example at a single layer precision of about 0.1 $\mu$m.

Nevertheless, such a method is not satisfactory as an essential three-dimensional process to form a freely curved face. The reason is that in the step difference caused by three-dimensional processing by the additive process, the variation of the shape in the thickness direction following lamination is discontinuous in proportion to the laminated thickness. Thus, in order to generate a continuously varying face by the additive process, a process for laminating a thin lamination film of about a single atomic layer at infinite times is required. This is an unrealistic process requiring an exceedingly great number of procedures, which is the reason why the additive process is not suitable for fine three-dimensional processing.

Then, the elimination process will be described.

The elimination process includes photo-etching, energy beam processing by means of a laser or electron beam, electrical discharge machining, electrolysis process, mechanical processes such as cutting, grinding, and polishing, and LIGA process described hereinafter in detail. The elimination process frequently comprises processing by placing a main device to remove materials at a point to be processed, and in this case, no essential difference in terms of processing is present in between the thickness direction and the crosswise direction vertical to the thickness direction. Therefore, it can be said that the process is suitable for three-dimensional processing.

Photo-etching generally promotes processing in a random direction, so the process requires a masking process in order to control the processing in the crosswise direction. For the photo-etching process, therefore, a work should be thin in the longitudinal direction. To apply the photo-etching process to three-dimensional processing, namely processing with a shape distribution in the thickness direction, masking processing and etching should necessarily be laminated in repetition, just as in the additive process. Thus, such photo-etching process is not suitable for fine three-dimensional processing for the same reason as for the additive process.

It has been known a process of pseudo three-dimensional processing capable of preparing a steep rise in the depth direction with no lamination procedure, by utilizing the difference in etching rate, depending on the crystallization direction. However, the process cannot freely realize a three-dimensional shape because the shape to be possibly processed is limited due to the crystallization direction.

A laser process is a process of cutting a work, for collimating coherent beams from laser oscillation into a narrow beam through an optical system such as lens and blowing out a material heated and melted locally at a high temperature. By the laser process, the beam collimation is at most about 2 to 3 $\mu$m due to the limitation of optical wave length and optical systems, so that it is very difficult to process a shape below the dimension by the laser process, with the resultant precision below the value. Additionally, controls in the depth direction are difficult, so that the process is essentially grouped as a two-dimensional process. In order to carry out a process simulating a three-dimensional process, lamination is essential. Thus, the laser process is also unsuitable for fine three-dimensional processing, for the same reason as that of photo-etching.

An electron beam process is a process of processing under controls of electrons discharged from an electric field in vacuum by collimating the electrons in a beam, but the process is essentially unsuitable for fine three-dimensional processing on the basis of the same reason as that of the laser process.

A process by means of excimer laser as an ultraviolet laser, having been practically used in recent years, is a process for directly cutting a molecular bonding via photon energy with almost the same bonding energy as that of polymer such as resins. Unlike the laser process, however, the process never requires the use of heat, so that the process is an excellent process capable of realizing more fine processing. Additionally, the control of photon energy enables the control in the depth direction at some extent.

Practically, however, metals as a main material of molds and ceramics are processed thermally, with no precision expectable. Even resin processing cannot be implemented freely as in the case with tools and devices, and therefore, the current process by means of an excimer laser still remains at a status of two-dimensional process.

E. W. Becker et al. disclose a LIGA process in "Fabrication of Microstructures with High Aspect Ratios and Great Structural Heights by Synchrotron Radiation Lithography, Galvanoforming, and Plastic Molding (LIGA process)" Microelectronic Engineering, vol. 4, pp. 35–36, 1986 (acronym of Lithografie, Galvanoformung, und Abformung, in German, meaning lithography, electric plating and molding, respectively), capable of overcoming such a practical limitation of photo-etching that photo-etching process can implement only two-dimensional process.

This process is an excellent process, which can achieve the fabrication of a fine structure with such an extremely high aspect ratio as a width of about 1 to 10 μm and a height of about several hundreds μm, by exposing an extremely thick photoresist to light by using a highly linear X-ray at a high power density of a giga eV grade from a synchrotron. The process can attain the highest fineness, for utilities with no need of any shape distribution in the thickness direction.

Because the LIGA process is characterized by the high aspect ratio owing to the linearity of X-ray, however, the LIGA process cannot yield a shape distribution such as free face with curvature in the thickness direction. Thus, the process is not suitable for fine three-dimensional processing.

In addition to those described above, the elimination process includes electrical discharge machining, electrolysis processing, ultrasonic processing and mechanical processing, by means of tools and devices. At these processes, tools are positioned three dimensionally, whereby the position to be processed can be controlled. Thus, it is said that these processes are essentially suitable for three-dimensional processing.

As described in "Microprocessing Technique, Basic Lecture Series, Micro Electro Discharge Machining", issued by Nikkan Kogyo Shinbun.Ltd., the electrical discharge machining can control the energy of generated discharge pulses below an energy as extremely low as 1 μjoule, owing to the instrumental technique of a discharge electric source. As described in "Research of Micro Electro Discharge, Vol. 3, Processing of Micromachine", Journal of the Japan society of Electrical-Machining Engineers, Vol. 28, No. 59, p.1–p.10, three-dimensional positioning of an extremely small electrode under controls can establish fine three-dimensional processing.

Even under any control of discharge conditions, due to the discharge phenomenon used as a processing principle of electrical discharge machining, wherein positive and negative charged particles are involved, the process cannot prevent the damage of a tool electrode with a small number of charged particles, so that the consumption of the electrode can scarcely be reduced to zero. As described in the "Research of Micro Electro Discharge Machining", $3^{rd}$ Report, Processing of Micromachines, the wear of the electrode deteriorates the dimensional precision of a work, which causes difficulty in three-dimensional free processing.

Additionally, an example of fine process through electro discharge machining using a fine wire is described in "Research of Fine Wire Electro Discharge Machining— Processing Technique using Wire Electrode of 10μm Diameter", Electric Processing Technique, Vol. 17, No. 57, p.13–p.18, 1993. The process is excellent with practically negligible electrode consumption, owing to continuous feeding of a fresh electrode. However, the shape to be processed is for example just a shape sawed with a thread saw, so that the process cannot fabricate a shape with a recessed face.

It is also described in Precision Machining of Micro Spindles, $1^{st}$ Report, Development of Wire Electrodischarge Grinding Method", Journal of Japan Society of Electro-Machining Engineers, Vol. 25, No. 48, p.14–p.23, a process capable of processing a fine shaft and a recessed face by folding a wire by means of a guide wire and using just the folding point as a processing point. The process is called as WEDG (Wire Electrical Discharge Grinding) process. However, the radius of the curvature of the wire and wire guide to be used at the process correspond to the diameter of a tool, which limits the size thereof to about several mm. Thus, the process is applicable to fine three-dimensional processing with much difficulty.

There has been known a process of fabricating a work, by using a similar electrode, for immersing the work piece in an electrolytic solution followed by applying of a voltage, and carrying out the fabrication by utilizing the electrolysis and dissolution. As described in "Overview of Electrolytic Machining", Metal Surface Technique, Vol. 31, No. 1, p.2–11, the process is advantageous in that no electrode wear occurs, unlike electro discharge machining. However, electrolysis phenomenon is not sensitive to the distance from an electrode, as is observed in electro discharge machining, so that the gap between the electrode and the work piece is large while the precision is at most ±0.03 mm, approximately. Thus, the electrolytic machining is limited to the processing of a dimension of about 0.1 mm, and the processing of a fine three-dimensional shape in unit μm is extremely difficult.

Additionally, "Ultrasonic Piercing", Machinery, Vol. 27, No. 27, p.1011–1020, 1964, describes a process for giving ultrasonic vibration to a tool and placing a abrasive grain on the tip of the tool and crushing a work piece through the vibration of the tool tip in a fine fashion. The ultrasonic process is effective for rigid and fragile materials to be processed, such as ceramics and glass. The precision of ultrasonic process depends on the diameter of the abrasive grain, and the tool itself is then worn. Thus, the precision of the process can hardly be below ±0.01 mm, currently.

Meanwhile, mechanical process carries out processing by physically putting a tool and a work piece in contact together to locally deform plastically the work piece and then separating and drawing out the material. Fine processes by using the principle of such mechanical process include a three-dimensional process by instrumentally positioning a tool under controls by using so-called general mechanical process for cutting by means of a cemented carbide tool and a diamond tool and a process using a different process from traditional mechanical processing technique.

As described for example in "Research of Vibration Processing System in Fine Field", Vol. 2, Proceedings of Spring-term Federation of Japan Society for Precision Engineering in 1995, p. 533–p.534, a process for cutting and processing an extremely micro region through ultrasonic vibration of a fine needle of single crystal diamond is known as a process employing a mechanism different from those by conventional mechanical processes. As described for example in "Mechanical Process in 1 nm Depth Unit of Mica under Atomic Force Microscope", Proceedings of Autumn-term Federation of Japan Society for Precision Engineering in 1994, p. 723–p.724, the removal and processing of mica in molecular unit can be attained via the frictional force from a probe of an atomic force microscope. Furthermore, a mechanical process by using an STM tungsten probe is described in "Mechanical Fine Processing by STM", Proceedings of Spring-term Federation of Japan Society for Precision Engineering in 1994, p. 5–p.6.

These processes can reduce the processing unit to a unit of atom or molecule as the essential requirement for fine processing, excellently.

However, a steric structure up to about several-$\mu$m cube is an area to be processed by these processes, so such processable area is too small, compared with an area of about several $\mu$m to several hundreds $\mu$m, primarily ten plus several $\mu$m to several tens $\mu$m, to be required for an ink-jet printer and microlens array. Therefore, the processes require a processing time of several tens of minutes to process a cube of several $\mu$m. Hence, the processing rate of these processes is currently too slow.

In order to fabricate a fine shape by using conventional cutting tools, it is essential that the cutting tools themselves should be small. The most serious problems involved in the fine cutting of the cutting tools include the wear thereof due to relative friction and the deformation and breakage of the cutting tools due to counter force. In order to overcome these problems, therefore, various attempts have been made conventionally.

Conventional technique for the purpose of fine cutting by mechanical processing is described below. These attempts are grouped into those mainly for the improvement of the cutting tools themselves, those mainly for the improvement of motion accuracy for processing, those mainly for the improvement of the machinability property of a work piece, and those mainly for the improvement of the environment such as processing atmosphere.

Firstly, a technique for the improvement of the cutting tools themselves mainly includes devices to prevent the wear and break of the cutting tools. Examples of such devices include a preventive device of the breakage of a cutting tool, by preparing the tool in a double structure made of a cemented carbide alloy of a highly rigid composition at the center of the tool and a cemented carbide alloy of a hard composition at a surface layer of the tool as described in Japanese Published Unexamined Patent Application No. 61-57123.

Additionally, a great number of devices for the improvement of the machinability property and wear resistance of tools have been attempted. Examples thereof include a coating process of a diamond film onto the surface of a cemented carbide tool, as described in Japanese Published Unexamined Patent Application No. Hei 1-201476.

Then, a conventional technique mainly for the improvement of the motion elements in processing is described below.

As discussed in "Drill Grinder with Fine Diameter and Performance of Centering Device", Sugawara et al., Proceedings of Autumn-term Federation of Japan Society for Precision Engineering in 1983, p.41, the centering of the rotation axis of a tool, the positioning of the rotation axis along the feeding direction of the tool, and the feeding straightness thereof are important for preventing the break and wear of tools such as microdrill and micro end mill. A device of such centering system and a device for reducing tool runout are described therein.

However, all of these devices are concerning how to carry out centering and chucking of a drill separately prepared. From the respect of general tool vibration, vibration at a level of 1 $\mu$m still remains, which is a serious problem for a fine tool, although such vibration is not so large.

As a technique to overcome such problem, it is described in "Application of WEDG onto Microdrill and End mill", Proceedings of Spring-term Federation of Japan Society for Precision Engineering in 1989, p.1091–p.1092 or "Development of Multi-purpose Fine Processing Machine for Concurrent Use for Discharge and Cutting", Proceedings of the 1-th National Conference of the Japan Society of Electrical-Machining Engineers, p. 111–114, 1991, a machining process for drill processing and end mill processing, comprising processing a fine microdrill or a fine end mill by using the WEDG process, and effecting the drill or end mill processing on the processed tool by using the tool itself.

Compared with conventional processes for mounting a drill or an end mill manufactured by a tool manufacturer onto a tool machine, the process can reduce the tool runout to zero, which vibration is due to the shift of the rotation center during the manufacture of a tool from the rotation center during the process by means of the tool, and therefore, the process is very excellent.

Then, those mainly for the improvement of the machinability property of a work piece are described below. Compared with the process for the purpose of improving tools, only a few examples thereof are illustrated. For example, Japanese Published Unexamined Patent Application No. Hei 5-9701 describes an example of thermal treatment of titanium. In this example, an oxide scale layer is prepared on the surface of titanium by heating titanium at 450° C. or more, and because of the fragile and chemically inactive properties of the resulting scale layer, the resulting titanium material can get good processability, whereby the wear of the tool is reduced. This is a representative attempt to control the properties of a work piece.

Japanese Published Unexamined Patent Application No. Sho 60-100601 discloses a technique for improving the cutting property of an iron sintered material, comprising processing the material in steam thereby producing an oxide film thereof. Additionally, Japanese Published Unexamined Patent Application No. Sho 63-105982 discloses a process of realizing an easier cutting process, for modifying the mechanical performance of ceramics through the chemical effect of wet etching and the effect of promoting chemical reaction with a laser.

As a technique to prepare a cutting atmosphere, Japanese Published Unexamined Patent Application No. Sho 63-102844 discloses a method for preventing oxidation of a tool thereby preventing the wear of the tool, comprising covering the cutting part thereof with a gas from which oxygen is removed.

Conventional techniques insofar described for the purpose of fine processing by machinery processes have securely improved fine mechanical processing, but the techniques are not satisfactory means to essentially overcome the wear or break of an extremely small tool. This will be described, through the calculation of the break conditions during end mill processing. The relation among them is described for example in "Deka-Ban Technical Books, All about End mill", issued Taiga Shuppan, K. K.

At the end mill process, tools are frequently required to be transferred in the vertical direction to the rotation axis, so that a bending moment works on the tools; as the tool diameter is smaller, the possibility of break, namely break and damage, due to the bending moment, is higher. This is represented by the following formula;

$$R = a \times V^p$$

wherein "R" represents cutting resistance (N/mm$^3$); "a" and "p" are material coefficients; and V is a volume removed per unit time.

This formula is discussed for example in the case of end milling. Below 20 $\mu$m of a tool diameter, the tool breaks, so that the resulting area is fallen into a state such that cutting of the area is nearly impossible. Hence, the fine processing by means of fine end mill depends on the extent how much the bending strength can be suppressed.

As described in Japanese Published Unexamined Patent Application No. Hei 1-201476, alternatively, the coating with a superficial hard film on a tool of a cemented carbide is effective for preventing the wear of the tool when a to-be-processed material with a higher hardness is processed, but the coating is not effective for the break during a process by means of fine end milling.

The double structure of a drill is effective for elevating the bending moment value as a break provision, but the fabrication of a drill of a double structure and with a dimension below 50 $\mu$m of itself is difficult.

It is believed that the use of the WEDG process described above is an essential element in order to overcome the problem of rotation vibration as one of the most significant factors of the breakage of microdrill. However, the process can prevent the application of a non-uniform and abnormal force onto a tool because of the vibration and rotation of the tool, but the process has no effect of modifying the break conditions or the bending moment value of itself. Thus, the process is insufficient, from such respect.

On the basis of the same reason, the device to adjust cutting atmosphere is not effective from the respect of break prevention, but the device rather focuses attention toward the prevention of wear. In other words, such an approach to improve the mechanical properties of tools can hardly carry out three-dimensional processing of about ten and several $\mu$m to about several tens $\mu$m.

It can be said that the device to impart a property to be readily cut to a work piece is highly effective for fine cutting and the device has a possibility of processing at an objective dimension. However, the processes described as the prior art have the following drawbacks.

More specifically, the process as described in Japanese Published Unexamined Patent Application No. Hei 5-9701, for heating titanium at 450° C. or more to generate an oxide scale layer on the surface, induces the preparation of the oxide scale layer on a wide area of the surface of a work piece because of the application of heat. Thus, it is impossible to limit the processing only to an intended area.

Additionally, because the superficial oxide scale layer is inappropriate as a mold, the layer should necessarily be processed, but the entire microfabricated complex area with recesses and protrusions can be difficult to remove. Therefore, the method described in the Japanese Published Unexamined Patent Application is not appropriate as a technique to prepare a microfabricated mold.

Those described above are also true with a process of improving the property of an iron sintered material to be cut for processing the material in steam thereby preparing an oxide film, as described in the Japanese Published Unexamined Patent Application No. Sho 60-100601, and the process in the publication is inappropriate as a technique for preparing microfabricated molds.

A process of modifying a cutting process of ceramics as readily processable by modifying the mechanical properties of ceramics through the mechanical effect due to grinding, the chemical effect due to wet etching, and the effect of propagating chemical reaction with a laser, as described in Japanese Published Unexamined Patent Application No. Sho 63-105982, wherein the intensity of laser irradiated has a distribution, hardly controls the positioning of a part where the mechanical properties should be controlled at a precision in the order of 0.1 $\mu$m which is required for three-dimensional processing at about ten plus several $\mu$m to several tens $\mu$m, as the object of the present invention. Thus, the process is difficult to apply to fine cutting. Furthermore, ceramics is a fragile material and is inappropriate for a mold from the respect of durability, disadvantageously.

A means for regulating the mechanical performance of a limited region of a work piece, including a metal material appropriate for molds, for example, aluminum, titanium, iron, nickel and cobalt, has been demanded, and the limited region should be at a level with a possibility of fine cutting.

SUMMARY OF THE INVENTION

It is an object of the present invention to provide a microcutting process as a machining process satisfying the aforementioned demands and a microcutting system capable of realizing the process.

In order to overcome the problems described above, this invention provides a microcutting method comprising:

a step of interposing an electrolyte between a work piece, made of a conductive metal, and an electrode;

a step of applying an electrolysis voltage between the work piece and the electrode at a state where the electrolyte is interposed between them, thereby generating a passive state film on the surface of a to-be-cut part of the work piece; and a step of cutting the passive state film on the surface of the to-be-cut part of the work piece by means of a cutting tool.

Additionally, the invention provides a microcutting process comprising:

a process of interposing an electrolyte between a work piece, made of a conductive metal, and an electrode; and a step of applying an electrolysis voltage between the work piece and the electrode at a state where the electrolyte is interposed between them, thereby generating a passive state film on the surface of a to-be-cut part of the work piece, while the surface of the to-be-cut part is concurrently cut.

In embodiments of the invention the cutting tool is conductive and is used as the electrode in a microcutting process.

An embodiment of the microcutting process is characterized in that a part corresponding to the thickness of the passive state film is cut out at the cutting process by means of the cutting tool, and a separation process separating the cutting tool from the work piece is arranged after the cutting process by means of the cutting tool;

the process of generating the passive state film and the cutting process by means of the cutting tool are effected after the separation process; and wherein the process of generating the passive state film, the cutting process by means of the cutting tool, and the separation process are carried out in repetition.

In the invention, a passive state film of an appropriate thickness is generated on the surface of an intended to-be-cut part of a work piece, by applying an appropriate voltage between the work piece and an electrode, for example an anode on the side of the work piece and a cathode on the side of the electrode, at a state where an appropriate electrolyte is interposed between the work piece and the electrode. According to the invention, then, the passive state film is cut by means of a cutting tool.

The passive state film is an oxide film or a hydroxide film, but the film has a different volume of a molar molecule (atom) from that of the raw material metal, so that the film expands, to increase the stress in the interface with the metal layer, and consequently, the film is then readily peeled off. Additionally, the film turns porous under appropriate electrolytic conditions or the mechanical properties of the film turn fragile so that the film is weakened. Thus, the film can be cut extremely readily.

Hence, the resistance of the film to cutting tools is reduced. Even if an extremely small cutting tool is used, the possibility of the break thereof can be reduced prominently. Therefore, the thickness of the passive state film on the work piece can be cut by means of a very small cutting tool; and then, a freshly generated passive film is generated and is then cut again. The process described above is repeated, whereby a desired fine shape can be cut. Thus, a work piece, made of a conductive metal material, can be cut and processed precisely at a fine dimension, including for example a mold of grooves with a width and a diameter of several $\mu$m to several hundreds $\mu$m, primarily ten and several $\mu$m to several tens $\mu$m.

Generally, metals have properties such that fine elastic deformation occurs in metals so that the metals are slipped off even if a cutting tool is going to cut into the metals when the metals are intended to be cut from a shallow depth of cut, and after the cutting tool passes away, then, the slipped part resumes its original state. Thus, the control of the depth of cut is inaccurate. As in the present invention, when a passive state film generated on the surface of a work piece is intended to be cut, almost no region with elastic deformation is present in the passive state film, compared with the original metal, and therefore, almost no slipping occurs, to attain thereby accurate cutting. Thus, even a very small depth of cut can be accurately controlled, whereby fine cutting can be achieved.

Because the passive state film can be controlled to a constant film thickness, depending on the electrolytic conditions, the depth of cut by means of a cutting tool can be adjusted to the thickness, readily. Additionally, the passive state film has an action to prevent the occurrence of modification of parts except the to-be-cut part due to excessive progress of oxidation thereof or the change of the shape thereof due to electrolysis and dissolution. Thus, owing to the formed film, only an intended part can be cut precisely.

Because a cutting tool itself is used as an electrode according to embodiments of the invention, the passive state film can be generated only in the vicinity of an intended to-be-cut part. Additionally, because it is not required any more to independently arrange a specific electrode to apply a voltage for electrolysis, the structure of a cutting system can be simplified.

In order to generate a passive state film, a voltage for electrolysis should be given to a work piece, made of a conductive metal material with a rapid rate of generating a passive state film, while the passive state film can be cut concurrently by means of a cutting tool. In this case, an excess current passes through the electrode due to short circuit, causing electrolysis and dissolution to develop deformation of a cutting part. In order to prevent this, then, a cutting tool should never serve bifunctionally but an electrode should be arranged independently. Then, the rate of generating a passive state film is sufficiently large; if the passive state film is of an insulating material, further, a cutting tool can be used as an electrode as described above.

However, some metal material does not generate a passive state film at a sufficient rate. The invention is effective in such case. More specifically, by means of a cutting tool, a depth of cut corresponding to the thickness of a passive state film is imparted to a work piece, and after the material is cut, the cutting tool is separated from the work piece by an appropriate distance. By applying again a voltage for electrolysis between the electrode and the work piece at a state where the electrode and the material are separated from each other by an appropriate distance, a passive state film is again generated. After imparting a depth of cut into the passive state film, the film is again cut. Such process is repeated speedily.

Even if the rate of generating a passive state film is slow, therefore, almost only the passive state film is cut for fine cutting.

The method according to this invention can be used for metal materials appropriate for molds such as aluminum, titanium, iron, nickel and cobalt.

Figure 1:
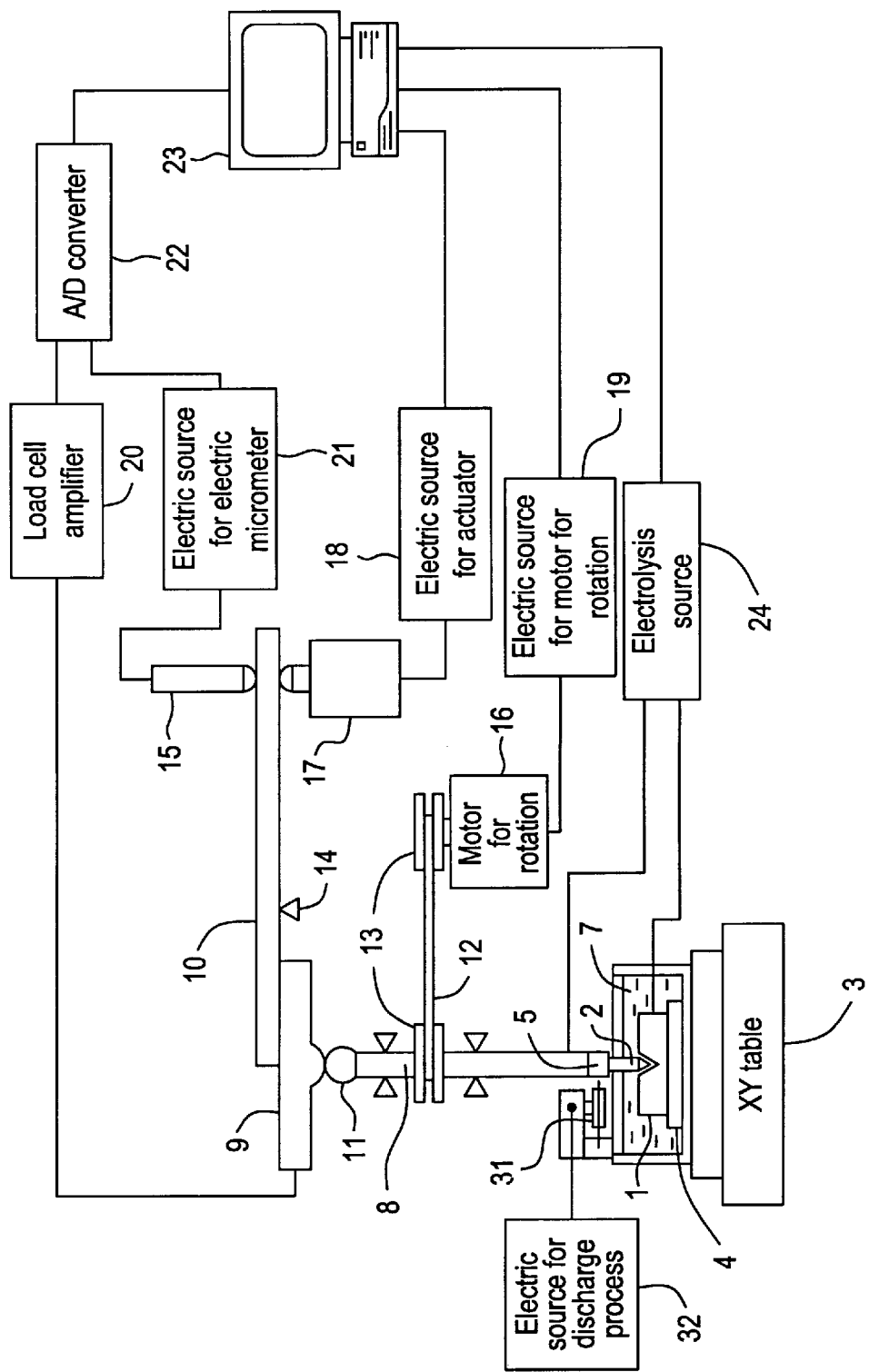
FIG. 1 is a view depicting the whole structure of one embodiment of the microcutting system of the present invention.
Figure 6A:
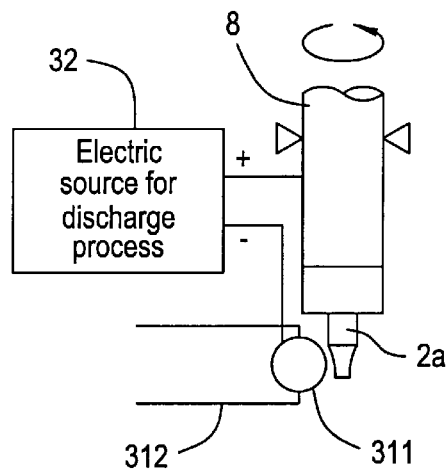
Figure 6B:
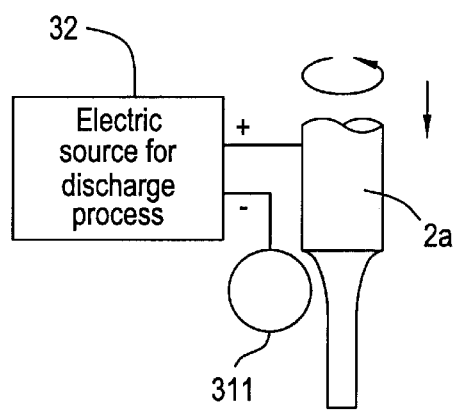
Figure 6C:
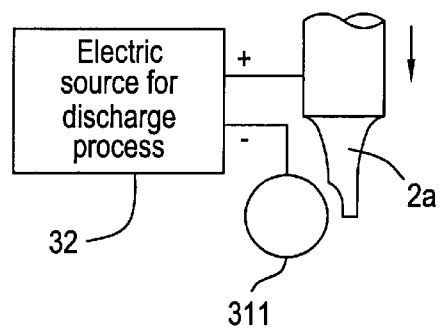
Figure 7:
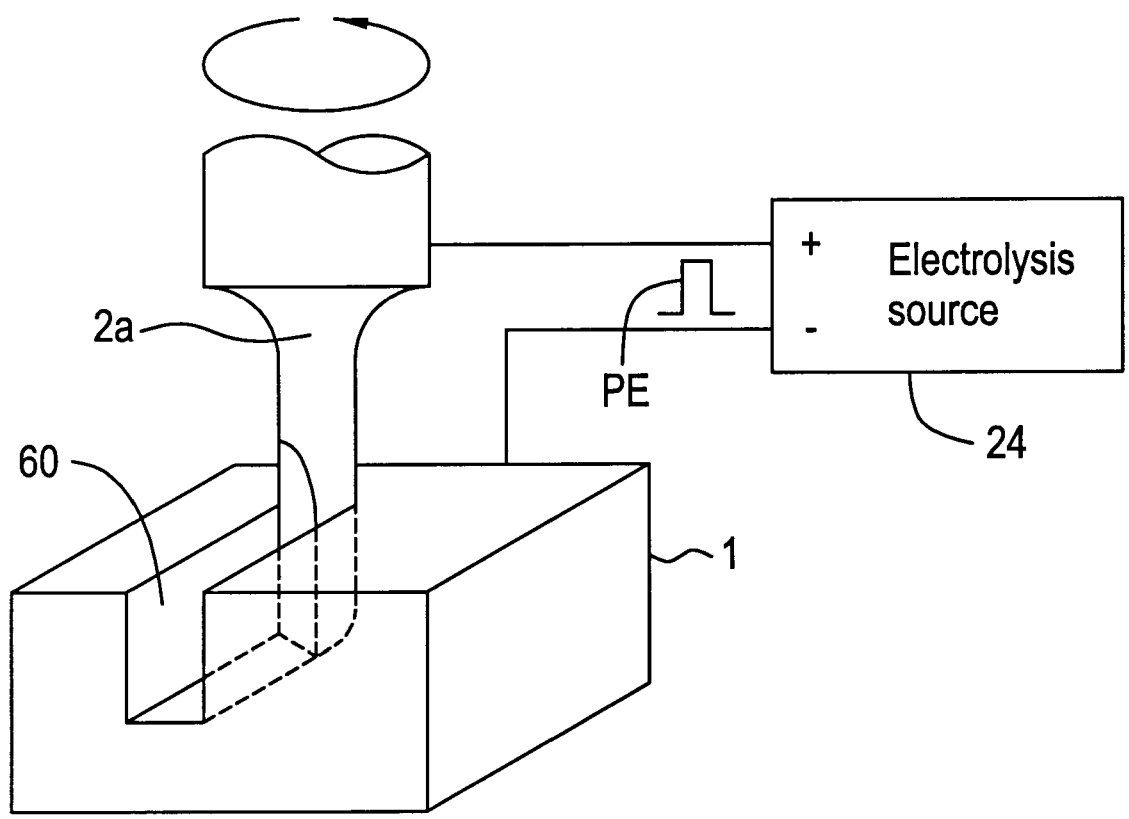
Figure 8A:
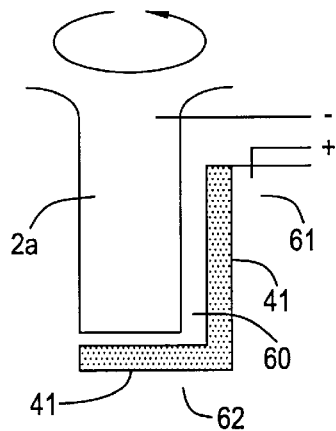
Figure 8B:
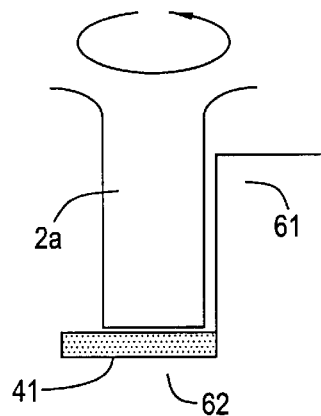
Figure 8C:
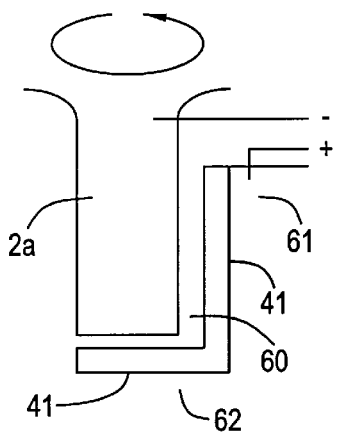
Figure 9:
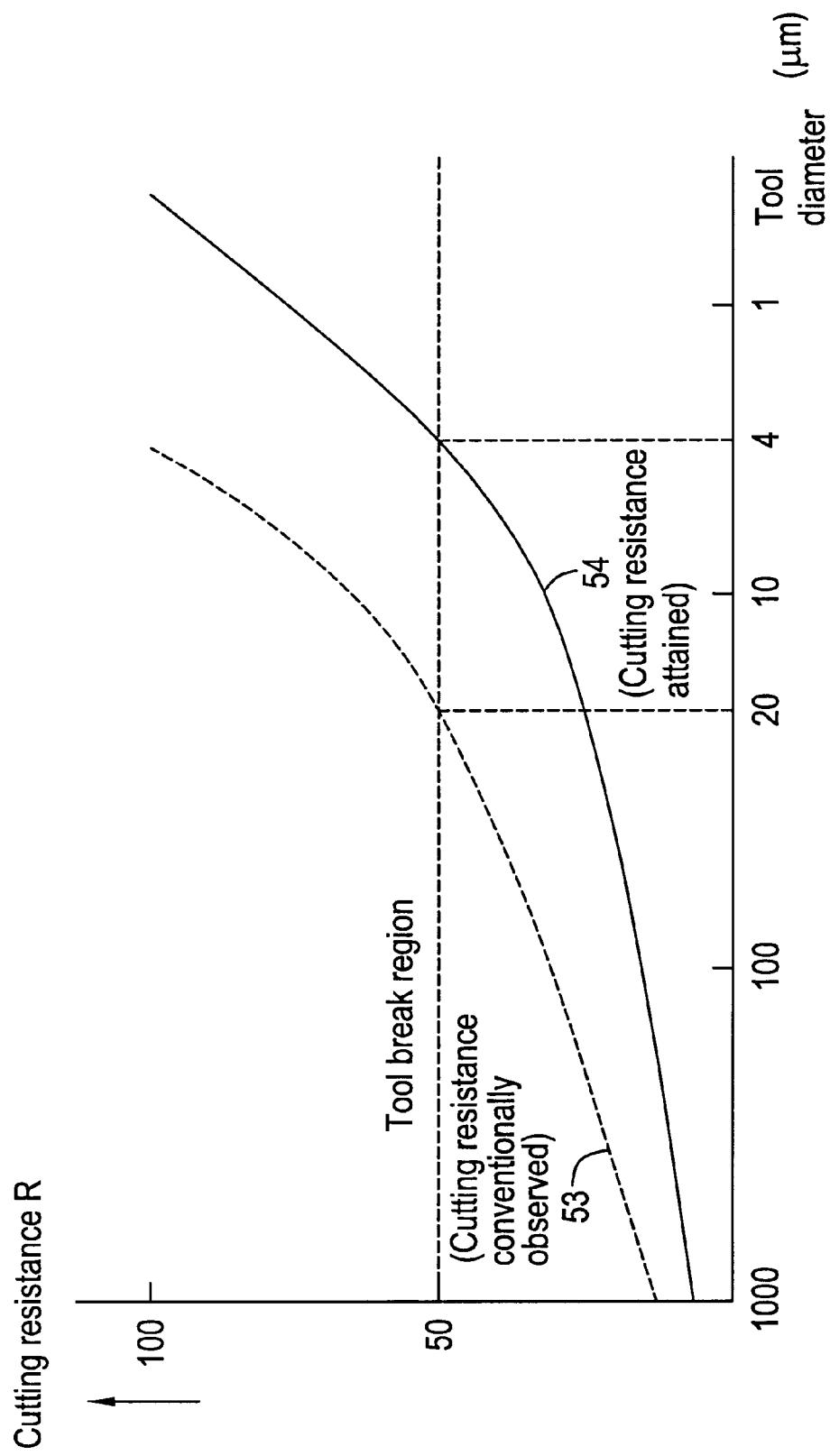
Figure 10:
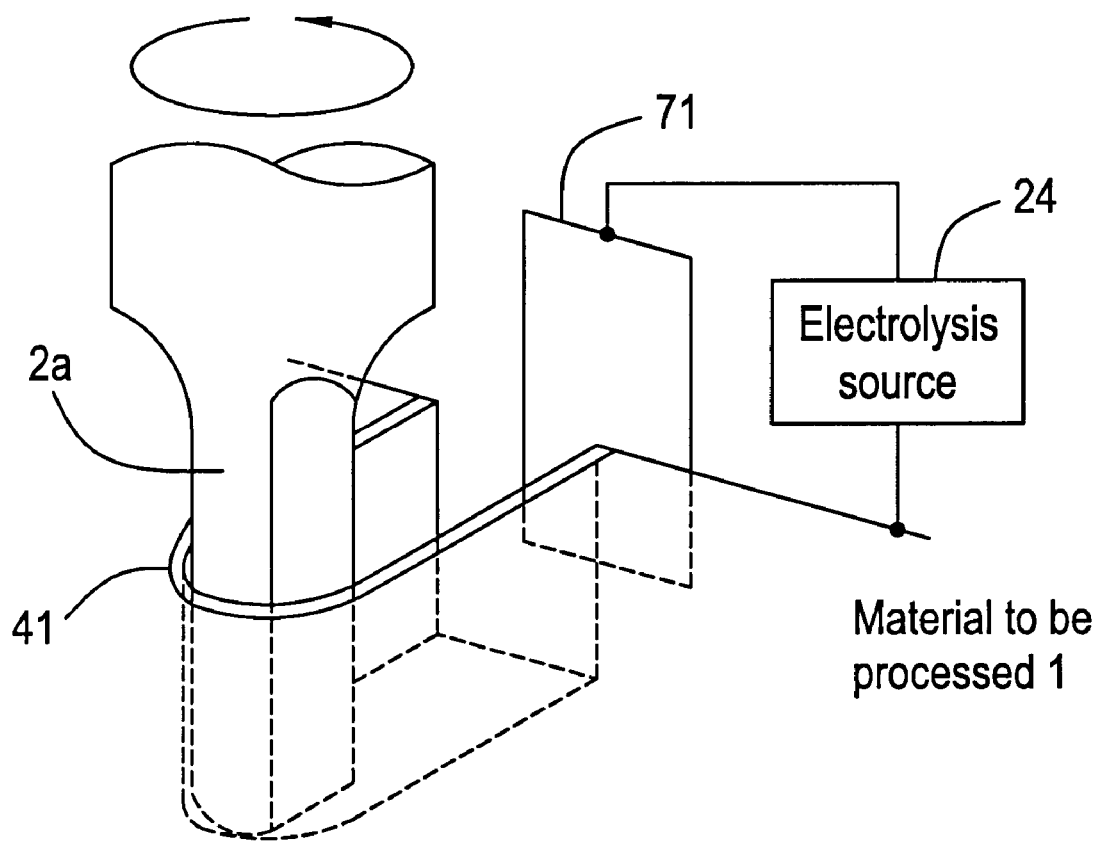
Figure 11:
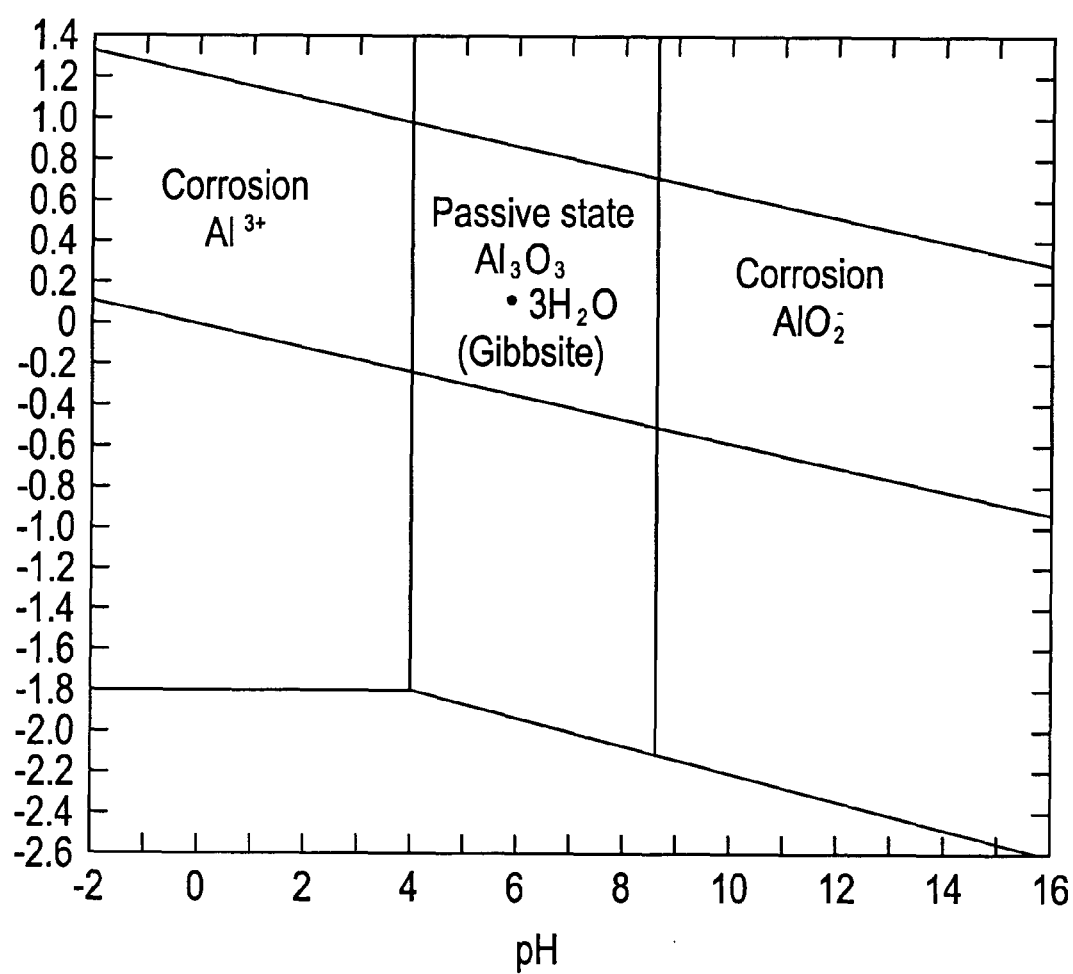

FIG. 5 is a view depicting the relation between the depth of cut by means of a cutting tool in the system of the embodiment of FIG. 1 and the counter force from the processing, on comparison with conventional example;

FIGS. 6(A)–6(C) are views depicting the process of manufacturing a cutting tool as another example to be used in the system of the embodiment of FIG. 1;

FIG. 7 is a view depicting a cutting example by means of the cutting tool of FIG. 6;

FIGS. 8(A)–8(C) are views depicting the microcutting process by means of the cutting tool of FIG. 6;

FIG. 9 is a view depicting the relation between the depth of cut by means of a cutting tool in the system of the embodiment of FIG. 1 and the counter force from the processing, on comparison with a conventional example;

FIG. 10 is a view depicting an example of independently arranging an electrode, with no use of any cutting tool as such electrode; and FIG. 11 is a view depicting the passive state film when a work piece is aluminium.

DESCRIPTION OF THE PREFERRED EMBODIMENTS

The present invention will now be described in embodiments with reference to drawings.

EXAMPLE 1

FIG. 1 depicts an example of the whole structure of the fine cutting system of Example 1. The example illustrates a cutting process of work piece 1 by means of fine cutting tool 2 made of a conductive cemented carbide. The material of the cutting tool 2 includes sintered diamond and sintered cBN (cubic boron nitride), because these are conductive and comprise an extremely hard material.

For cutting the work piece 1 by means of the cutting tool 2, the cutting tool 2 and the work piece 1 are immersed in electrolyte 7. Because the cutting tool 2 is conductive in this example, herein, the cutting tool of itself is designated as electrode; an electrolysis voltage is applied between the cutting tool 2 as the electrode and the work piece 1, as described below, to generate a passive state film on the surface of the work piece 1. The passive state film is cut by means of the cutting tool 2.

As the electrolyte 7, in this Example, use is made of an aqueous 0.1N sodium nitrate solution. The sodium nitrate solution as the electrolyte is characteristic in that the electrolytic current efficiency of the solution is high at a part with a higher current density around the electrode, while the efficiency is rapidly lowered at a low current density at parts apart from the electrode. Thus, the sodium nitrate if used as the electrolyte is effective for generating a passive state film only at a desired part through electrolysis, while preventing the electrolysis effect at parts excluding the desired part, which is the essential requirement for fine cutting. The surface of the work piece 1 can be effectively weakened.

The work piece 1 is fixed on jig 4 in a tank filled with electrolyte 7. The tank filled with the electrolyte 7 is fixed on XY table 3. The XY table 3 transfers the work piece 1 in two directions vertical to each other, to precisely position the work piece 1 on a horizontal surface. The XY table 3 should have a positional resolution of at least 0.1 μm, preferably 0.01 μm in this Example. As described hereinbelow, the resolution is essential to impart a depth of cut just corresponding to the thickness of the passive state film formed on the surface of the work piece 1.

The cutting tool 2 is precisely supported with ceramic sleeve 5. The ceramic sleeve 5 is fixed on metal mandrel 8 produced at an extremely high cylindricity. Then, by means of a ceramic V bearing processed at an extremely high precision, the mandrel 8, the ceramic sleeve 5 and the cutting tool 2 are structured so that these might be rotated at an extremely small runout.

The rotation power of the cutting tool 2 is generated from motor for rotation 16. More specifically, pulleys 13, 13 are mounted on the rotation axes of the mandrel 8 and the motor for rotation 16, and through O-ring 12 suspended between these pulleys 13, 13, the rotation power of the motor for rotation 16 is transmitted through the mandrel 8 to the cutting tool 2. Structurally, the motor for rotation 16 is driven by means of electric source 19 for the motor for rotation 19, and the operation of the motor 16 is regulated and controlled by means of personal computer 23 to which is connected the electric source 19 for the motor for rotation.

The cutting tool 2 is capable of transfer in the vertical direction (the direction of Z axis), and the transfer in the direction of Z axis is carried out through lever 10 by actuator 17. The actuator 17 is driven at a source voltage from electric source 18 for the actuator. The electric source 18 for the actuator is connected to the personal computer 23, in order to control the output source voltage by the personal computer 23. 14 represents the supporting point of the lever 10.

Additionally, steel ball 11 to prevent the transmission of the influence of the rotation of the mandrel 8 over the side of the lever 10, and load cell 9 for micro-loading in order to measure cutting resistance, are interposed between the lever 10 and the mandrel 8. The cutting resistance measured with the load cell 9 is supplied through load cell amplifier 20 to A/D converter 22, where the resistance is transformed into digital data and is then transmitted to the personal computer 23.

The transfer of the cutting tool 2 in the direction of the Z axis is measured at a resolution of 0.001 μm by means of electric micrometer 15. Electric source 21 for electric micrometer feeds the electric source voltage to electric micrometer 15; and the source 21 also feeds the data of the measured position of the cutting tool 2 in the direction of Z axis to the A/D converter 22. Then the A/D converter 22 digitally transforms the data and transmits it to the personal computer 23. Under the controls of the position of the cutting tool 2 through personal computer 23 on the basis of the transfer data from the electric micrometer 15, cutting is effected in the manner as described below.

During cutting operation, an electrolysis voltage is applied from the electrolysis source 24 between the work piece 1, made of a conductive material, and the cutting tool 2 made of a conductive material. Then, an electrolysis voltage is applied to the cutting tool 2 as a cathode and to the work piece 1 as an anode. The cutting tool 2 is connected electrically through a brush to the terminal of the electrolysis source 24 while the tool 2 rotates. As the electrolysis source 24, use is made of an electric source of direct current at a constant voltage; and the voltage to be applied is, for example, 5 V.

During the applying of such electrolysis voltage, a passive state film as an oxide film is formed on the surface of the work piece 1 in this Example. By giving a depth of cut corresponding to the thickness of the formed passive state film to the work piece 1 by means of the cutting tool 2, the work piece 1 is cut.

In this Example, the passive state film is formed, prior to the cutting of a depth of cut in the work piece 1 by means of the cutting tool 2, taking account of the case where the rate of forming the passive state film is slow, and after the formation of the passive state film, then, cutting is effected, correspondingly to the thickness of the passive state film. After the termination of such cutting in a corresponding fashion, the cutting tool 2 is set back at an appropriate distance from the work piece 1, to keep an appropriate distance from the material 1. Then, a depth of cut is given after a passive state film is again formed, to cut the film. By speedily repeating the process described above, the work piece 1 is cut.

The electrolysis source 24 is controlled of its output voltage, by means of the personal computer 23. Additionally, the electrolysis source 24 detects the electric current passing through the cutting tool 2 as the electrode and the work piece 1. Via an A/D converter internally placed, then, the voltage and electric current data are digitally transformed and transmitted to the personal computer 23.

In the present embodiment, the cutting blade of the cutting tool 2 is fabricated prior to use, while the tool 2 is supported on the ceramic sleeve 5.

This is because when a cutting tool with a cutting blade is mounted on ceramic sleeve 5, runout sometimes occurs due to the occurrence of eccentricity during mounting thereof, which makes fine cutting processes difficult. If the tool mounted on ceramic sleeve 5 is subjected to a process for the cutting blade, the runout can be reduced to almost zero. Because no runout occurs, the application of any unexpected force on the tool can be prevented effectively, with almost no runout, so that the processing action can be applied only to the weakened part made of the passive state film, resulting in elimination of break of the tool.

In the present Example, a wire electrical discharge grinding process called WEDG process as described above is used for processing the cutting blade. As described above, the process is excellent in that the runout, due to the rotation center for manufacturing tools and the rotation center for processing by means of tools, can be made zero, compared with conventional processes for mounting drills and end mills manufactured by tool manufacturers onto fabricating machines.

In order to fabricate tool 2 by the wire electrical discharge grinding process, the fine cutting system in the present Example is provided with electrical discharge machining machine 31 for processing a tool cutting blade, as shown in FIG. 1. Then, a source voltage is fed from electric source 32 for electrical discharge machining, to the electrical discharge machining machine 31 for processing tool cutting blade, to effect the cutting blade process of cutting tools, as described below.

Following the series of processes, the fine cutting process using the fine cutting system in the present Example is described. In the present Example, the process of fabricating the cutting tool 2 is effected, prior to any practical process of cutting. With reference to FIG. 2, the process of fabricating the cutting tool 2 is described.

Figure 2A:
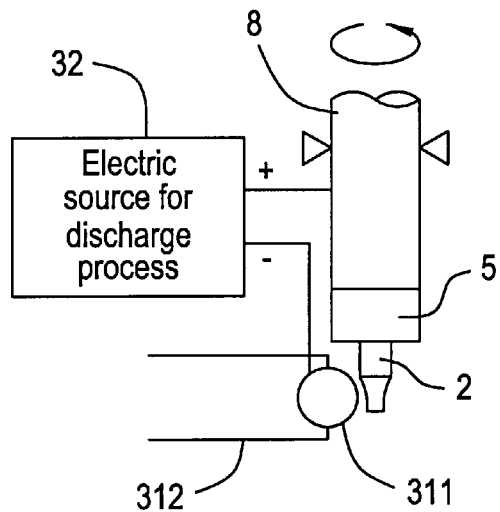
FIGS. 2(A)–2(D) are views depicting the process of manufacturing a cutting tool to be used in the system of the embodiment of FIG. 1.

As shown in FIG. 2(A), firstly, the tool 2 is supplied as a cylindrical cemented carbide material, to be then mounted on ceramic sleeve 5 at a high precision. On receipt of a source voltage from the electric source 32 for electrical discharge machining, electrical discharge machining machine 31 runs along wire guide 312, while running wire 311 is used as the tool electrode, whereby the cutting tool 2 is fabricated into a desired shape.

Figure 2B:
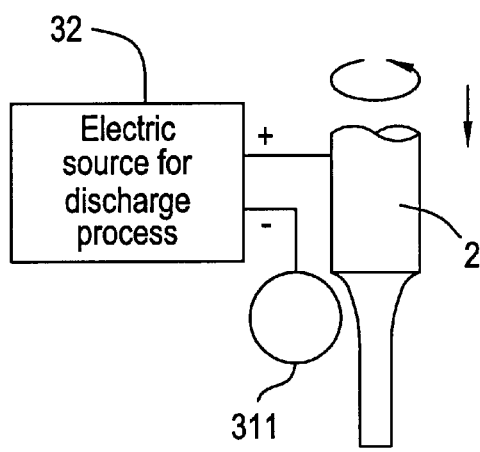

As shown in FIG. 2(B), in this case, the cutting tool 2 is machined by means of the running wire 311 to a desired diameter of the tool 2, for example about 25 $\mu$m in this Example, while the tool is transferred under rotation at a rate of 1 $\mu$m/s downward along the direction of Z axis. Because the tool 2 is thus fabricated, the running wire 311 is used as a cathode; and the tool 2 is used as an anode.

The running wire 311 is set to run at a very constant tension and a constant velocity on a wire running system not shown in figures. The electric source 32 for electrical discharge machining is so-called power-accumulation type electrical discharge machining electric source using CR oscillation circuit, and a processing liquid should be fed, under consistent flow of pure water immediately after ion exchange, not shown in figures. In order to fabricate tool 2 of a diameter of about 25 $\mu$m at a high precision, appropriately, the electric source voltage is 70 V, while the condenser capacity should be about 22 pF.

Figure 2C:
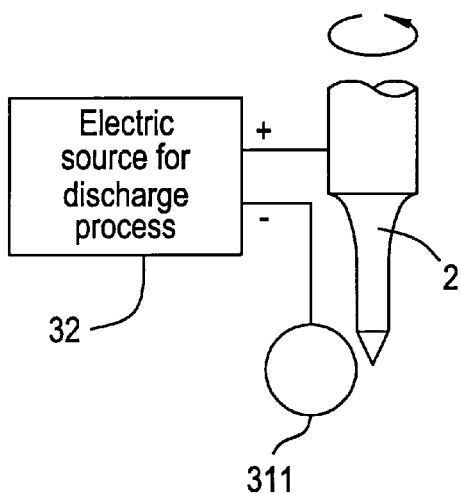

After the completion of a process of the cutting tool 2 with a final diameter of 25 $\mu$m and a final length of 75 $\mu$m, the tip thereof is fabricated in a conical shape (see FIG. 2(C)). This is because the break of the tool 2 due to vibration and rotation can be prevented by using the chamfer part of a pierced part as the rotation center, which breakage easily occurs during the initial stage of piercing through the work piece 1.

The process is effected, by using the slope face in the oblique part above the running wire 311. For easy understanding, the relation between the running wire 311 and the tool 2 is not accurately shown dimensionally in FIG. 2(C); practically, the diameter of the running wire 311 is sufficiently large, compared with the diameter of the tool 2, so that the tip of the tool 2 can be prepared into a beautiful conical shape.

It is needless to say that the tip of the tool 2 can be processed into a conical shape, by transferring the running wire 311 behind, while the tool 2 is transferred along the direction of Z axis, like routine conical process. Such a fine dimension does not make any significant difference between the above process and the process using the slope face of the running wire 311 as in this Example.

Figure 2D:
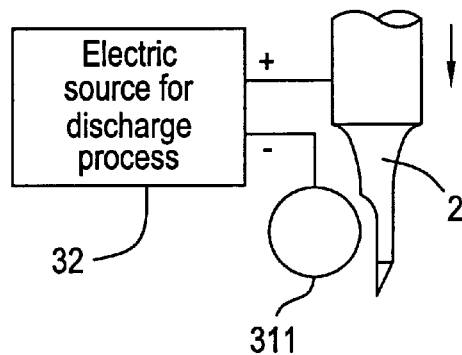

Then, the cutting tool 2 stops its rotation. At a state of rotation under stoppage, the cutting tool 2 is transferred at a rate of 1 $\mu$m/s downward along the direction of Z axis, and as shown in FIG. 2(D), electrical discharge machining is again initiated from the tip, as shown in FIG. 2(D). Until the electrical-discharge-machined face reaches a face passing through the rotation center of the tool 2, the electrical discharge machining is continued, so that the tool 2 is finally prepared into a semi-cylindrical shape.

The preparation of the tool 2 into such semi-cylindrical shape resides in that the debris from the processing of the work piece 1 by means of cutting tool 2 can be discharged properly. Thus, the cutting tool 2 is completed.

Depending on the diameter of the running wire 311, the cutting tool 2 appropriately rotates while the tool 2 is transferred downward along the direction of the Z axis, to possibly fabricate a recess in a spiral shape.

Using the cutting tool 2 thus manufactured, in the present Example, work piece 1, made of cast iron, is subjected to a cutting process in the thickness direction. With reference to FIG. 3, the cutting process is serially described.

Figure 3A:
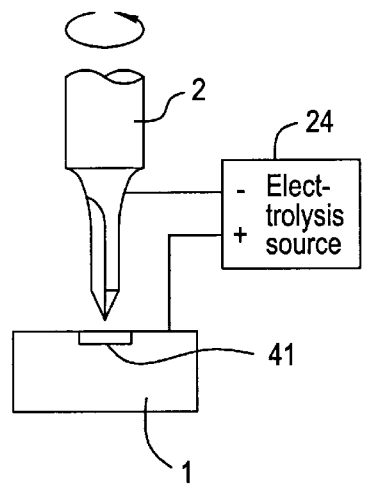
FIGS. 3(A)–3(F) are views depicting one example of the microcutting process of the present invention.
Figure 3B:
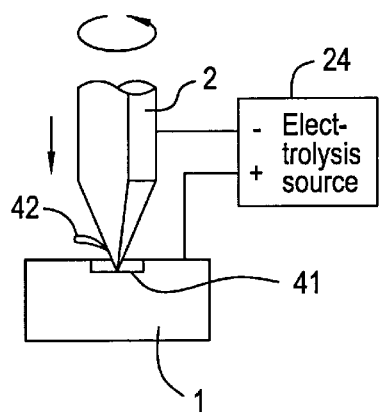
Figure 3C:
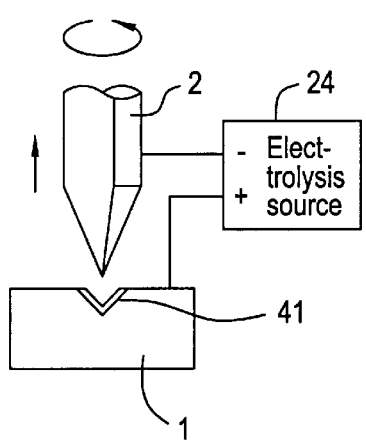

As shown in FIG. 3(A), initially, the rotating cutting tool 2 and the work piece 1 rest stationarily, at a state where the tool 2 and the material 1 are opposed to and separated from each other, with an interval at an appropriate distance of about 5 $\mu$m to 25 $\mu$m. In this case, pure water as a electrical discharge machining liquid is eliminated, and as has been described above, electrolyte 7 composed of an aqueous 0.1N sodium nitrate solution is charged in a processing tank, where the cutting tool 2 and the work piece 1 are immersed in the electrolyte 7.

At such state, as described above, the cutting tool 2 is supported as a cathode, while the work piece 1 is supported as an anode, under supply of an electrolysis voltage in a direct current at a constant voltage of 5V from electrolysis source 24. Subsequently, soft passive state film 41 of a thickness of about 0.1 $\mu$m is formed on the surface of the work piece 1 positioned opposite to the cutting tool 2 (see FIG. 3(A)).

Figure 4:
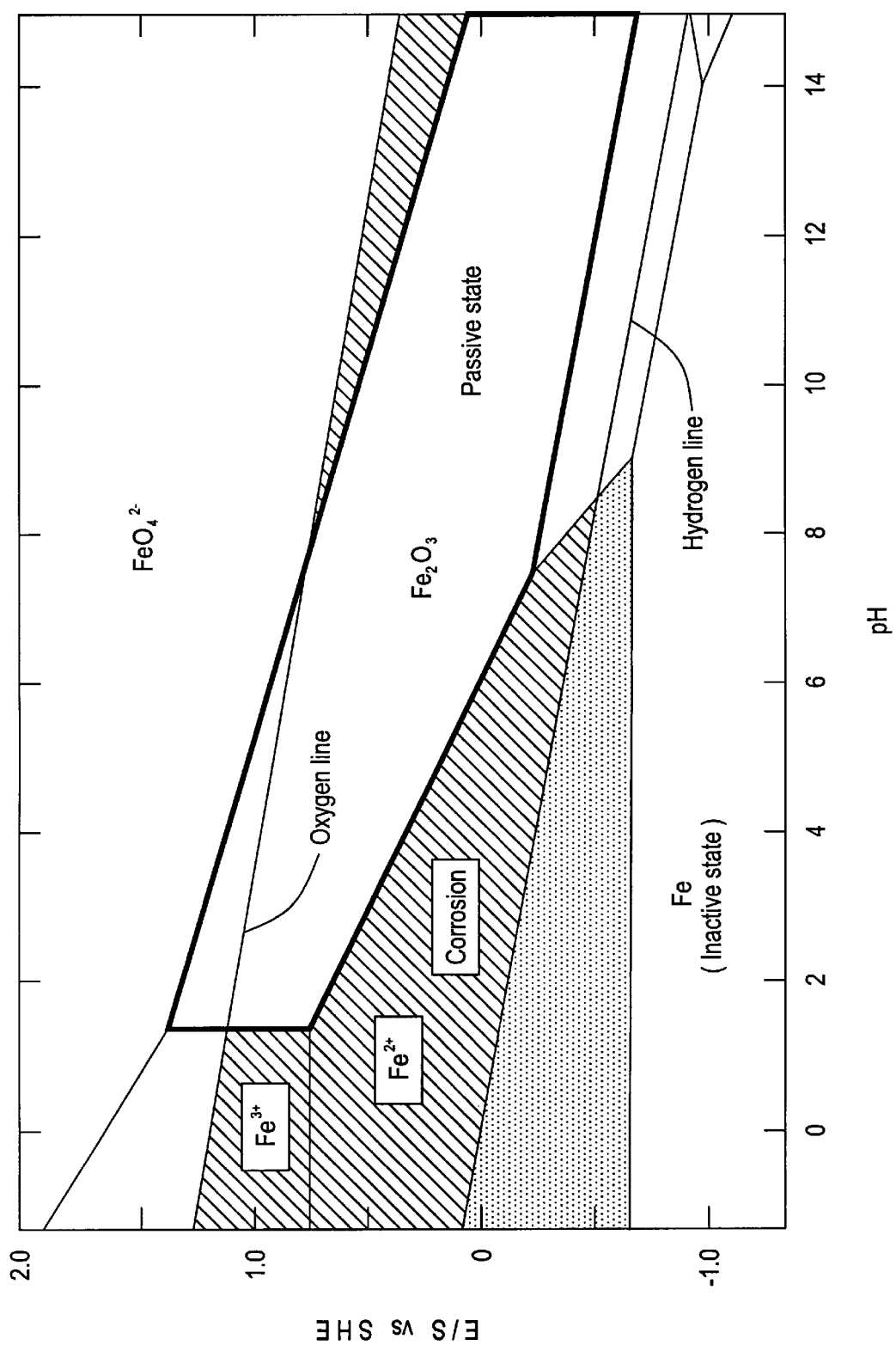
FIG. 4 is a view depicting the generation of a passive state film.

FIG. 4 depicts the characteristic corrosion properties of iron (Fe), in a so-called potential-pH diagram of Fe—$H_2O$. As apparently shown in the figure, the values of the pH of the electrolyte and the electrolysis voltage indicate that the passive state film of $Fe_2O_3$ is formed on the surface of cast iron. In FIG. 4, furthermore, the dashed area represents a redox-type corrosion region; and the netted area depicts a hydrogen-generation type corrosion region.

In this Example, use is made of sodium nitrate as the electrolyte 7. When sodium chloride is used as an electrolyte, the current efficiency does not depend on the density of the electrolysis current. However, the electrolyte of sodium nitrate has a property such that the current efficiency is rapidly reduced at a smaller density of the electrolysis current. Around the electrode, accordingly, the electrolysis is effectively promoted, and adversely, the electrolysis action is prominently deteriorated at parts far from the electrode, accompanied by the reduction of the current density.

In the present Example, passive state film 41 is formed only in the vicinity of parts at a short distance between the work piece 1 and the cutting tool 2, by using the cutting tool 2 itself as the electrode and controlling the electrolysis voltage through the action of sodium nitrate. In other words, the passive state film 41 is formed only in the vicinity of the work piece 1, which is intended to be cut by means of the cutting tool 2.

About one second after the initiation of the applying of the electrolysis voltage, the cutting tool 2 is transferred downward along the direction of the Z axis by means of actuator 17, to put the cutting tool 2 in contact with the work piece 1, and thereafter, the cutting tool 2 is further transferred just by 0.05 $\mu$m. Subsequently, the transfer is terminated. Then, the cutting tool 2 is drawn up by 0.2 $\mu$m along the direction of the Z axis (see FIG. 3(B) to FIG. 3(C)).

Figure 3D:
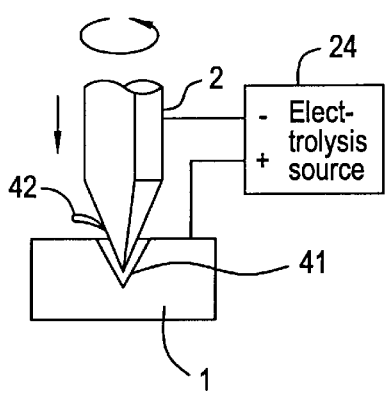
Figure 3E:
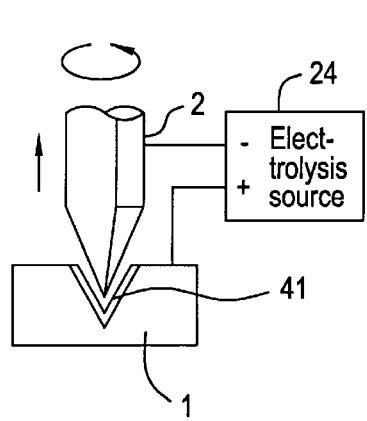
Figure 3F:
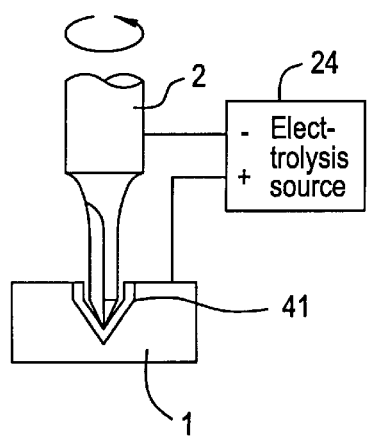

Immediately thereafter, the cutting tool 2 is transferred downward along the direction of the Z axis and further transferred just by 0.05 $\mu$m again from the position thereof in contact with the work piece 1 (see FIG. 3(D)). Then, the cutting tool 2 is again drawn up by 0.2 $\mu$m (see FIG. 3(E)) along the direction of the Z axis. In such manner, the cutting tool 2 makes a depth of cut constantly at 0.05 $\mu$m from the contact position downward along the direction of Z axis while the cutting tool 2 is drawn up by 0.2 $\mu$m from the position, and the process is repeated, whereby the cutting process is facilitated as shown in FIG. 3(F). Furthermore in FIGS. 3(B) and (D), 42 represents cut debris.

The microcomputer 23 then functions to control the actuator source 18 under the controls of the position of the cutting tool 2 on the basis of the transfer data of the cutting tool 2 from the electric micrometer 15, whereby the transfer and setback of the cutting tool 2 can be controlled.

Based on the current data from the electrolysis source 24, the personal computer 23 can detect the contact of the cutting tool 2 and the work piece 1, as a timing to initiate cutting process. The personal computer 23 maintains a memory of the position of the cutting tool 2 in contact with the work piece 1 along the direction of the Z axis, as the superficial position of the to-be-cut part of the work piece 1, and defines the position as a starting point of making a depth of cut. Based on the starting point of the depth of cut as the base, the transfer and setback of the cutting tool 2 is controlled along the direction of the Z axis.

In such operation, the cutting tool 2 processes only the soft passive state film 41 formed on the surface of a to-be-cut part of the work piece 1, so the tool 2 can process the work piece 1 at an extremely small repulsion, compared with direct processing of metal.

FIG. 5 depicts the repulsion to the processing vs. the depth of cut, wherein curve 51 shows performance during processing by the same process as in the present invention but with no applying of electrolysis in pure water; curve 52 shows performance during processing by the cutting process of the present invention.

As readily understood in FIG. 5, at a depth of cut corresponding to the thickness of the passive state film 41, the repulsion to the processing by the cutting process of the present invention is reduced by about 40%, compared with the repulsion by the same process except for no applying of electrolysis in pure water. In FIG. 5, the values of the repulsion from processing by these processes are equal around 0.1 $\mu$m, because the metal part is concurrently cut at the depth of cut because the thickness of the passive state film 41 is below 0.1 $\mu$m.

The passive state film can be controlled to a constant film thickness under electrolytic conditions. Additionally, such passive state film can prevent the modification of parts due to excessive progress of oxidation therein excluding a to-be-cut part, or the film can prevent the modification of the shape through electrolysis and dissolution.

If the rate of forming a passive state film is not sufficiently high, because of a metal material as a work piece, the work piece is subjected to a process for cutting at a depth corresponding to the thickness of the passive state film, by means of a cutting tool, whereby the material is cut, subsequently setting the tool back by an appropriate distance to keep an appropriate distance from the material, thereafter applying a voltage again to form a passive state film again and give a depth of cut, followed by cutting. The above process is repeated at a high speed, effectively.

In the aforementioned Example, use is made of a sodium nitrate solution as the electrolyte, and as described above, the sodium nitrate solution as the electrolyte has a characteristic property such that the electric current efficiency is rapidly lowered at a low current density at parts apart from the electrode and is characteristic in that the electrolytic current efficiency of the solution is high at a part with a higher current density around the electrode, while the efficiency is rapidly lowered at a low current density at parts apart from the electrode, so that the electrolytic action is extremely reduced. Except for the objective to-be-cut part, the electrolysis voltage is given in order to reduce the current density, whereby the region under the influence of the electrolysis action can be limited owing to the voltage gap, so that it is prevented that the electrolysis action influences unnecessary parts except for the objective to-be-cut part, which enables the fabrication at a high precision.

Because the wire electrical discharge grinding process is used as the process of fabricating the cutting tool 2 in the embodiment described above, the runout can be reduced to almost zero, which is the essential requirement for fine cutting process; additionally, the application of an expected force to the tool can be prevented and a processing action can be imparted only to the part of the weakened part of the passive state film because of no vibration. Thus, the process effectively eliminates the break of the tool.

Due to the semi-cylindrical shape of the cutting tool 2, the tool 2 can be fabricated in a simple manner; additionally, the tool 2 is in such a shape that a cylinder is cut along a face passing through the rotation center, and therefore, the blade can act through the entire bottom face of the processed part, which is effective for excellent processing.

Depending on the type of a metal material, even iron steel for example has different performance in generating a passive state film during electrolysis, due to the difference in carbon content; for example, iron steel such as cast iron generates a relatively too thick passive state film, involving a thickness variation. In such case, it is observed that the applying of a voltage at a pulse state effectively stabilizes the thickness of the passive state film.

This is because a passive state film of a larger thickness is likely to be generated when an electrolysis voltage is a constant voltage in direct current, involving a relatively large electric current at the initial stage of applying. Alternatively, a pulse voltage generates a passive state film at a constant current efficiency.

EXAMPLE 2

In this Example 2, a cutting tool is transferred in the crosswise direction relative to work piece 1, to effect groove processing of a cast iron work piece 1. Even in this Example 2, the same effect as in Example 1 can be recovered.

The structure of a fine cutting system is almost the same as depicted in FIG. 1. In this Example, however, the transfer of the XY table 3 is also controlled by personal computer 23.

In this Example as shown in FIG. 6, cutting tool 2a is manufactured by a wire electrical discharge grinding process. The process is different from the process shown in FIG. 2, in that the tip of the cylindrical shape is not ground in a slanting fashion. More specifically, the tip is electrical-discharge-machined to a predetermined diameter (see FIG. 6B) and the resulting cylinder is cut through a face passing through the rotation center to form a semi-cylindrical shape in this Example (see FIG. 6C).

As shown in FIG. 7, then, an electrolysis voltage is given from electrolysis source 24 between the rotating cutting tool 2a and the work piece 1, to generate a passive state film. Subsequently, in this Example, the work piece 1 as fixed on the XY table 3 is transferred by means of the XY table 3, to cut the passive state film by means of the rotating cutting tool 2a, whereby groove 60 is formed. In this Example, pulse voltage PE is applied as an electrolysis voltage, to generate a passive state film of stable thickness.

FIG. 8 shows the procedures of the cutting process. As shown in FIG. 8(A), the cutting tool 2 and the to-be-cut part of the work piece 1 should be separated from each other in an opposing manner to each other at an interval of a distance of about 5 $\mu$m to 25 $\mu$m at its initial stage. As in the Example 1, electrolyte 7 comprising an aqueous 0.1N sodium nitrate solution is filled in a processing tank, where the cutting tool 2a and the work piece 1 are immersed in the electrolyte 7.

At that state as described above, pulse voltage PE as an electrolysis voltage is given from the electrolysis source 24 between the cutting tool 2a and the work piece 1, while the cutting tool 2a is used as an anode and the work piece 1 is used as a cathode. Then, soft passive state film 41 of thickness of about 0.1 $\mu$m is generated on the surface of the work piece 1, which surface positions opposing to the cutting tool 2a (see FIG. 8(A)).

After the generation of the passive state film 41, the work piece 1 is transferred under the controls of the XY table 3, in an adverse direction to the direction of groove 60 to be generated, to put the cutting tool 2a in contact with the work piece 1, and then, the work piece 1 is transferred by a distance corresponding to the thickness of the passive state film 41, for example 0.05 $\mu$m, while pushing down the cutting tool 2a in the direction of the Z axis to the bottom of the groove and then stopping the tool 2a, to cut the part of the passive state film 41 on the wall side of the groove 60 (FIG. 8(B)

Thereafter, the cutting tool 2a is drawn up for example by 0.2 $\mu$m in the direction of the Z axis, while the XY table 3 is transferred for example by 0.2 $\mu$m in the back direction, to separate the cutting tool 2a from the work piece 1 (FIG. 8(C)).

In the same manner as in the Example 1, the personal computer 23 controls the position and transfer of the cutting tool 2a in the direction of the Z axis, and also controls the transfer of the XY table 3. At a state where the cutting tool 2a and the work piece 1 are separated from each other as shown in FIG. 8(C), the personal computer 23 also controls the electrolysis source 24, to again apply the pulse voltage PE as an electrolysis voltage between the cutting tool 2a and the work piece 1. In such manner, the passive state film 41 is formed at the cut part of the work piece 1, as shown in FIG. 8(C).

Then, the work piece 1 is transferred in an adverse direction to the direction of the groove 60 formed, to further transfer the work piece 1 again by 0.05 $\mu$m from the position in contact with the cutting tool 2a, while the cutting tool 2a is pushed down to the bottom of the groove in the direction of the Z axis. Subsequently, the cutting tool 2a is again drawn up by 0.2 $\mu$m along the direction of the Z axis, while the XY table 3 is transferred by 0.2 $\mu$m in the back direction, in order to separate the cutting tool 2a from the work piece 1. Such processes as shown in FIG. 8(B) and FIG. 8(C) are repeated.

In such manner, each depth of cut of 0.05 $\mu$m from the contact position is consistently cut in the groove cutting direction, and the tool is then separated by 0.2 $\mu$m from the position in the direction of the Z axis and adverse to the cutting direction, and by repeating the procedures, the groove cutting process should be progressed.

Once the groove 60 is formed in this Example, passive state film 41 is generated not only on wall 61 as a to-be-cut part of groove but also on bottom 62. The passive state film 41 on the side of the bottom 62 effectively prevents the progress of excess oxidation involving modification and the shape deformation due to electrolysis and dissolution, on the side of the bottom 62, except for the part to be subjected to the cutting process.

FIG. 9 depicts the relation between the tool diameter of a cutting tool comprising a cutting tool material of a cemented carbide and the cutting resistance R during the process of groove cutting, wherein the relation is represented in solid line 54 in the present Example 2 while the relation is represented in dotted line 53 during a conventional groove cutting process. FIG. 9 indicates that a cutting tool with a tool diameter up to about 4 $\mu$m can be used in this present Example 2, while a tool break region appears at a tool diameter of about 20 $\mu$m in the conventional example. Thus, it is indicated that an extremely fine tool can be used. In accordance with the present invention, thus, fine three-dimensional processing is possible under the three-dimensional controls of the cutting tool 2.

Modified Example

In accordance with the present invention, the electrolysis voltage is not necessarily elevated, as described above, but depending on the properties of a metal material, it is desired to elevate the electrolysis voltage. When the cutting tool 2 or 2a is used as an electrode as in the above Example, in such case, the cutting tool as the electrode is comprising a work piece during cutting, causing thereby short circuit, so that a damage may occur in the work piece.

Only when the cutting tool 2 or 2a is separated from the work piece 1, in this case, an electrolysis voltage is applied. During the cutting process, the applying of the voltage is terminated. The applying of the electrolysis voltage is controlled by means of personal computer 23. The personal computer 23 then controls the applying of the electrolysis voltage, under constant controls of the position of the cutting tool 2 or 2a and the position of the work piece 1, as described above.

In such manner, the electrode and the work piece never come in contact with each other mechanically during the applying of the electrolysis voltage, even when the cutting tool also serves a role of an electrode, so that any damage on the work piece or the tool is prevented.

The material of the cutting tool is not limited to conductive cemented carbide as in the Examples, but the material includes non-conductive materials such as single crystal diamond and ceramics. When such non-conductive materials such as single crystal diamond and ceramics are used for such tool, the tool cannot be used as an electrode. The same effect can be recovered as the effect through the use of conductive cutting tools, by positioning then a conductive electrode around the cutting tool.

FIG. 10 is a structural example wherein the cutting tool 2a comprises single crystal diamond and electrode 71 as a cathode is positioned opposite to the to-be-cut part of the work piece 1, for a groove cutting process as in the Example 2.

When the passive state film on the surface of the work piece has hard and fragile properties, the cutting tool is preferably used as a grinding-like machining utilizing recesses and protrusions formed by electrical discharge machining. In this case, the size of the recesses and protrusions on the surface of a cutting tool is controlled by adjusting the conditions of the electrical discharge machining to fabricate the cutting tool, and by utilizing the recesses and protrusions as a tool, grinding process is effected. In this case, such a blade as that of the cutting tool described above is not necessarily fabricated.

In the same manner as in the Examples, the electrolytic action progresses in the grinding process utilizing the recesses and protrusions, whereby the part of the passive state film can be ground. Debris from the process is filled in the fine recesses and protrusions during use, so that the cutting effect of the tool may be deteriorated. Taking the case into account, an electrolysis dressing consisting of the steps of reversing the polarity of the electrolysis voltage at an appropriate timing and solubilizing the debris packed in the recesses and protrusions during the process, should be carried out.

The electrolysis dressing is preferably effected at a state of the electrode being set back from the work piece, and in this case, the work piece can be used as an electrolysis dressing electrode, which effectively promotes the electrolysis dressing.

As a raw material of the work piece, use is made of iron-series metals such as nickel and cobalt, other than iron, because the resulting passive state film has then some insulation properties. Accordingly, the invention is applicable. The passive state film of iron in particular among iron-series metals in an electrolyte has been investigated, and the present invention is advantageously applicable to the film. The passive state film generated on the surface of the metal described above is mechanically fragile and weak.

Additionally, the advantages of the present invention are readily exerted in metals with an insulating passive state film on the surface thereof, such as titanium and aluminium. As to aluminium, depending on the state of an oxide film thereon as a passive state film, the passive state film is harder than the metal layer.

As shown in FIG. 11, the corrosion region, passive state region and inactive state region of aluminum are determined, depending on the voltage and pH, like the case of iron, and the passive state region is present in a neutral region of about pH 5 to 9. Generally, a porous film through anode oxidation process is used industrially for aluminium, but a great number of researches have been carried out concerning the process of preparing these films, so that films with excellent chemical stability and mechanical performance can now be used.

Conditions of generating these films, however, do not reside in the passive state region but reside in an aqueous acid solution with a lower pH than pH 5 as shown in FIG. 11. Films are generated by utilizing the difference between the generating rate of oxide film and the dissolution rate thereof in solution during direct current electrolysis. The porous anode oxidization film thus formed have variously modified properties, depending on the conditions, but by reducing the current density and elevating the solution temperature, the resulting film gets so soft properties that the film can be mechanically processed excellently. The present invention is hence applicable to the film.

Even in the passive state region in FIG. 11, additionally, electrolysis under agitation by using aluminum as an anode for example in a neutral NaCl solution generates soft aluminum hydroxide ($Al(OH)_3$) in gel, which attains excellent mechanical processing. Hence, the present invention can be applied to the resulting product.

Furthermore, titanium has an extremely poor processability, because metal titanium has a larger deformation resistance as a material property, with a lower volume specific heat and a small coefficient of thermal conductivity, so that the part of titanium to be processed is readily heated at a high temperature, which indicates that titanium is chemically active at a high temperature. Even titanium with poor processability can be microfabricated in accordance with the present invention. Thus, a work piece, made of titanium or titanium alloy, in particular, can effectively be microfabricated in accordance with the present invention.

As has been mentioned insofar, in accordance with the present invention, a passive state film is formed on the metal surface through electrolysis, and the resulting passive state film is then cut. Because the passive state film is thin and has soft properties with no extension in the depth direction, only the passive state film can be three-dimensionally microfabricated in accordance with the present invention, which has never been attained conventionally.

What is claimed is:

1. A microcutting method comprising the steps of:
   interposing an electrolyte between a work piece, composed of a conductive metal, and an electrode;
   applying an electrolysis voltage between the work piece and the electrode while the electrolyte is interposed between the work piece and the electrode, thereby generating a passive state film on only a selected portion of the surface of the work piece that is adjacent to the electrode; and
   cutting the passive state film on the surface of the work piece with a cutting tool.

2. A microcutting method according to claim 1, wherein said cutting tool is conductive and is used as the electrode.

3. A microcutting method according to claim 1, wherein:
   a portion corresponding to a thickness of the passive state film is cut out during the cutting step with the cutting tool, and further comprising a separation step of separating the cutting tool from the work piece after the cutting step with the cutting tool;
   wherein the generating of the passive state film and the cutting step with the cutting tool are conducted after the separation step; and
   wherein the generating of the passive state film, the cutting step with the cutting tool, and the separation step are performed a plurality of times.

4. A microcutting method according to claim 3, wherein the electrolysis voltage is applied between the electrode and the work piece during the forming of the passive state film, while the work piece and the cutting tool are separated from each other.

5. A microcutting method according to claim 1, wherein the electrolysis voltage applied between the electrode and the work piece during the process of forming the passive state film is pulsed.

6. A microcutting method according to claim 1, wherein the work piece comprises a metal or a metal alloy capable of forming an insulating passive state film thereon.

7. A microcutting method according to claim 6, wherein the metal is selected from the group consisting of iron, nickel, cobalt, titanium, and aluminium, and the metal alloy contains iron, nickel, cobalt, titanium, or aluminium.

8. A microcutting method according to claim 1, wherein the electrolyte is an aqueous sodium nitrate solution.

9. A microcutting method according to claim 1, wherein the step of cutting comprises positioning the cutting tool in contact with the workpiece and moving the cutting tool toward the workpiece by a distance that is less than the thickness of the passive state film.

10. A microcutting method according to claim 1, wherein the step of cutting comprises cutting substantially only the passive state film generated on the surface of the workpiece.

11. A microcutting method comprising the steps of:
interposing an electrolyte between a work piece, composed of a conductive metal, and an electrode; and
applying an electrolysis voltage between the work piece and the electrode while the electrolyte is interposed between the work piece and the electrode, thereby generating a passive state film at only a selected portion of the surface of the work piece that is adjacent to the electrode, while the surface of the workpiece is concurrently being cut.

12. A microcutting system, comprising:
means for interposing an electrolyte between a work piece, composed of a conductive metal, and an electrode;
means for applying an electrolysis voltage between the work piece and the electrode while the electrolyte is interposed between the work piece and the electrode, and generating a passive state film on only a selected portion of the surface of the work piece that is adjacent to the electrode; and
means for cutting the passive state film on the surface of the work piece with a cutting tool.

13. A microcutting system according to claim 12, further comprising:
a supporting table for supporting the work piece during cutting;
cutting tool supporting means for supporting the means for cutting;
moving means for three-dimensionally moving the cutting tool relative to the work piece; and
control means for controlling said moving means in order to cut the passive state film on the surface of the work piece with said cutting tool.

14. A microcutting system according to claim 13, wherein said control means controls the means for applying an electrolysis voltage so that the electrolysis voltage is applied between the electrode and the work piece while said cutting tool and the work piece are separated from each other.

15. A microcutting system according to claim 13, wherein said cutting tool is conductive and is used as the electrode.

16. A microcutting system according to claim 13, wherein said cutting tool is of a semi-cylindrical shape.

17. A microcutting system according to claim 13, wherein said cutting tool is of a cylindrical shape, and includes recesses and protrusions formed by electrical discharge machining that function as a microcutting tool.

18. A microcutting system according to claim 17, wherein said control means functions such that the polarity of the electrolysis voltage applied between the electrode and the work piece is reversed at a desired interval, for electrolysis dressing of the cutting tool using the work piece as a dressing electrode.

19. A microcutting system according to claim 18, wherein said control means reverses the polarity of the electrolysis voltage while the electrode is separated from the work piece.

20. A microcutting system according to claim 13, wherein said cutting tool is fabricated by using a wire electrical discharge grinding method while the cutting tool is supported on said cutting tool supporting means.

21. A microcutting tool according to claim 20, wherein said cutting tool is of a semi-cylindrical shape.

22. A microcutting system according to claim 20, wherein said cutting tool is of a cylindrical shape and recesses and protrusions formed through the wire electrical discharge grinding method serve as said microcutting tool.

* * * * *